(No Model.)
W. R. COMINGS.
APPARATUS FOR INDICATING TEMPERATURES OF DISTANT ROOMS.
No. 294,201. Patented Feb. 26, 1884.
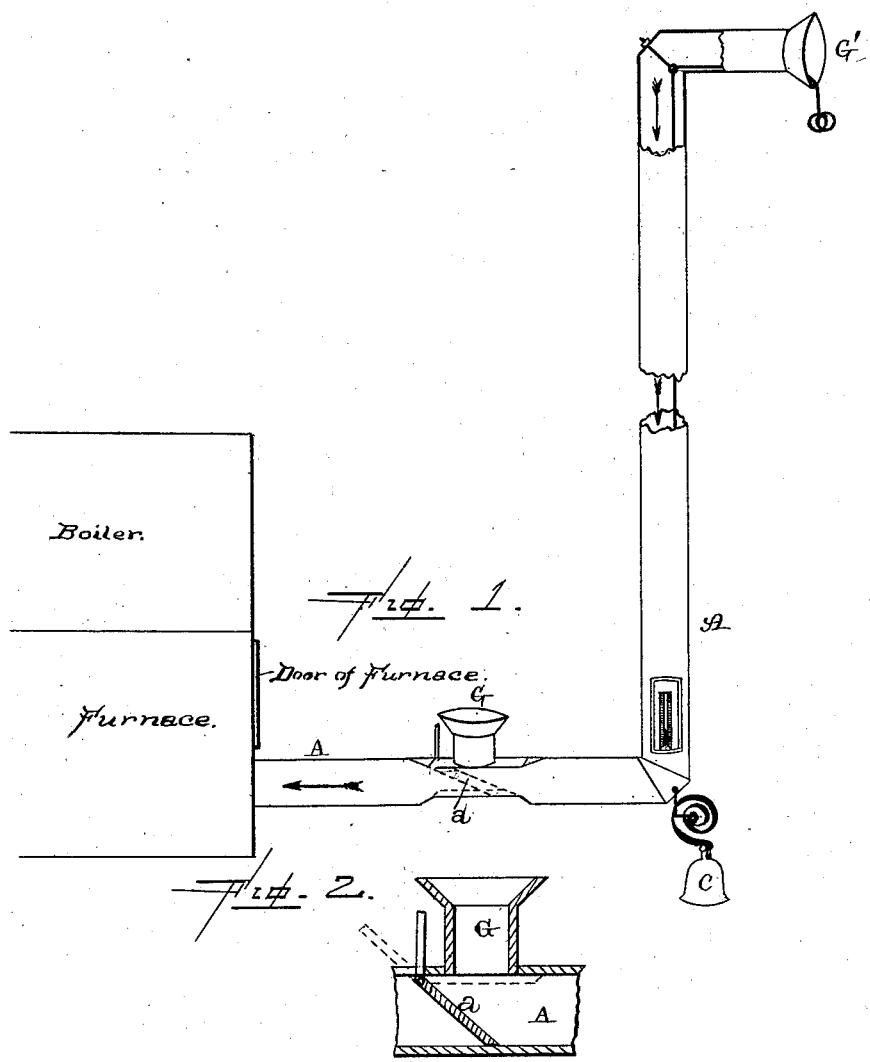

UNITED STATES PATENT OFFICE.

WILLIAM R. COMINGS, OF NORWALK, OHIO.

APPARATUS FOR INDICATING TEMPERATURES OF DISTANT ROOMS.

SPECIFICATION forming part of Letters Patent No. 294,201, dated February 26, 1884.

Application filed August 27, 1883. (No model.)

*To all whom it may concern:*

Be it known that I, WILLIAM R. COMINGS, of Norwalk, in the county of Huron and State of Ohio, have invented certain new and useful Improvements in Apparatus for Indicating Temperatures of Distant Rooms; and I do hereby declare the following to be a full, clear, and exact description of the invention, such as will enable others skilled in the art to which it pertains to make and use it, reference being had to the accompanying drawings, which form part of this specification.

My invention relates to an improvement in apparatus for indicating temperatures of distant rooms; and it consists in the combination of a suitable pipe, which connects at one end with a room which is distant from the heating apparatus, and connected at its other end to an exhaust mechanism or draft of furnace for drawing air from the room, and which pipe is provided with a thermometer for indicating the temperature of the air, and with a suitable mouth-piece and valve, whereby the pipe can be used as a speaking-tube, when necessary.

Figure 1 is a perspective of an apparatus embodying my invention. Fig. 2 is an enlarged vertical section taken through the mouth-piece and valve.

A represents the pipe, made of any suitable sheet metal, and which is connected with a distant room or apartment at one end and with a suitable exhausting mechanism or draft of furnace at the other end. The furnace itself, acting by its draft, may be used, or the exhausting mechanism that is used may be of any suitable kind, will be located at or near the heating apparatus, so that the engineer or fireman in charge of the said apparatus can set the exhausting mechanism in operation at any time, so as to cause a current of air to pass from the distant room through the pipe. Inside of this pipe, at any suitable point where the engineer or fireman can readily consult it, is placed a thermometer, which will be held in place in the pipe by any suitable means, and the opening in the pipe through which the thermometer is inserted will be covered by a piece of glass, mica, or other transparent material. The current of air passing through the pipe affects this thermometer, and in a few minutes shows the engineer or fireman what the temperature of that room is, and he can then turn on or regulate the heat as he sees fit. In order to enable the person in the distant room to attract the engineer's or fireman's attention, a bell, C, is attached to the pipe at any suitable point, and then a cord or wire is made to pass up through the pipe to the room. A person pulling this wire or cord will cause the bell to ring, and thus notify the engineer. To enable two persons to then converse there is placed in the pipe A, at any suitable point, a valve or check, *a*, and just above this valve or check is placed an ordinary mouth-piece, G, such as is used in connection with speaking-tubes. This valve or check will prevent the voice from being carried past the mouth-piece whenever it is closed, as well as any current of air from passing through the pipe in either direction at the time. Upon the upper end of the pipe A is also formed a mouth-piece, G', which will be used by the occupant of the room in conversing with the engineer. The attention of the engineer or fireman having been attracted by the ringing of the bell, the conversation can then be carried on through the pipe, and the engineer or fireman notified as to what temperature is desired. When the valve *a* is raised, the pipe A is opened for the passage of the draft and the mouth-piece closed, and when the valve is dropped the pipe A is closed and converted into a speaking-tube.

Having thus described my invention, I claim—

The combination of the pipe A, provided with mouth-pieces G G', a thermometer located in the pipe, a valve which can be used either to check the flow of air through the pipe or to close the lower mouth-piece, and a mechanism for exhausting the air through the pipe, substantially as shown and described.

In testimony whereof I affix my signature in presence of two witnesses.

WM. R. COMINGS.

Witnesses:
GEO. W. KNAPP,
M. O. VANFLEET.